United States Patent [19]
Juarez

[11] Patent Number: 4,738,006
[45] Date of Patent: Apr. 19, 1988

[54] NET MENDING DEVICE

[76] Inventor: Manuel Juarez, 1403 Valentine Rd., Kansas City, Mo. 64111

[21] Appl. No.: 923,495

[22] Filed: Oct. 27, 1986

[51] Int. Cl.⁴ .......................................... F16G 11/00
[52] U.S. Cl. ...................... 24/115 A; 24/298; 24/129 W; 24/129 B; 24/300; 24/335
[58] Field of Search ............... 24/115 A, 128, 129 R, 24/129 B, 129 W, 129 A, 298-302, 335, 339, 265 A, 30.5 W, 38, 703; 403/300, 291

[56] References Cited

U.S. PATENT DOCUMENTS

| | | | |
|---|---|---|---|
| 191,339 | 5/1877 | Hayden | 403/206 |
| 279,306 | 6/1883 | Adamson | 24/298 |
| 849,921 | 4/1907 | Schelling | 24/115 A |
| 1,644,077 | 10/1927 | Nesbitt | 24/129 W |
| 2,563,533 | 8/1951 | Knox | 24/115 A |
| 2,641,036 | 6/1953 | Reiter | 24/129 B X |
| 3,000,067 | 9/1961 | Hanflig | 24/298 |
| 3,026,533 | 3/1962 | Zakarin | 24/335 X |
| 3,766,926 | 10/1973 | Bliss | 24/335 X |
| 4,539,748 | 9/1985 | Brown et al. | 403/300 X |

FOREIGN PATENT DOCUMENTS

| | | | |
|---|---|---|---|
| 131419 | 5/1929 | Switzerland | 24/298 |
| 143336 | 1/1931 | Switzerland | 24/115 A |

Primary Examiner—Kenneth J. Dorner
Assistant Examiner—Laurie K. Cranmer
Attorney, Agent, or Firm—Kokjer, Kircher, Bradley, Wharton, Bowman & Johnson

[57] ABSTRACT

A device for mending a broken cord in a sports net. The device includes a pair of ferrules having deformable flaps that can be crimped onto the broken cord ends. The ferrules can be connected with each other by a flexible cord element gripped by sleeves on the ferrules, by a rigid connecting strip, or by a flexible cord element threaded through openings and gripped by the flaps crimped onto the broken cord ends. In the latter case, the broken cord ends are threaded through the openings and knotted to enhance the security of the connection.

3 Claims, 1 Drawing Sheet

NET MENDING DEVICE

BACKGROUND AND SUMMARY OF THE INVENTION

This invention relates in general to the repair of damaged nets and more particularly to a device for mending broken cords of a sports net.

Meshwork nets are used in a wide variety of sports, including basketball, tennis, volleyball, badminton, soccer and fishing. The net is typically formed from interwoven cords that can be made of nylon or another suitable synthetic or natural material. Substantial forces are often applied to the nets, and they are at times subjected to considerable abuse. Consequently, it is not uncommon for one or more of the cords to become frayed or broken, especially after the net has been in service for an extended time. At present, nets having broken cords are usually either taken down and thrown away or are maintained in service despite their defective condition.

The present invention is directed to a device which serves to mend a broken cord in a meshwork net. Through use of the device, a broken or unduly worn net can be restored to essentially the same condition it was in prior to the damage. As a result, it is not necessary to discard the net or to continue to use it in a defective condition.

It is an important object of the invention to provide a net mending device which can be applied to repair a broken net cord in a manner to restore the net to an undamaged condition.

Another object of the invention is to provide a device of the character described which is able to repair cords having broken or frayed portions that vary in length.

A further object of the invention is to provide a device of the character described which can be securely applied to the broken cord in order to impart to the mended cord adequate strength to withstand the forces applied to it in service.

An additional object of the invention is to provide a device of the character described which is simple and economical to manufacture and which may be quickly and easily applied to a damaged cord without the need for special skills or special tools.

Still another object of the invention is to provide a device of the character described which does not detract significantly from the appearance or functional ability of the net.

Other and further objects of the invention, together with the features of novelty appurtenant thereto, will appear in the course of the following description.

DESCRIPTION OF THE DRAWING

In the accompanying drawing which forms a part of the specification and is to be read in conjunction therewith and in which like reference numerals are used to indicate like parts in the various views.

DETAILED DESCRIPTION OF THE INVENTION

Figure 1:
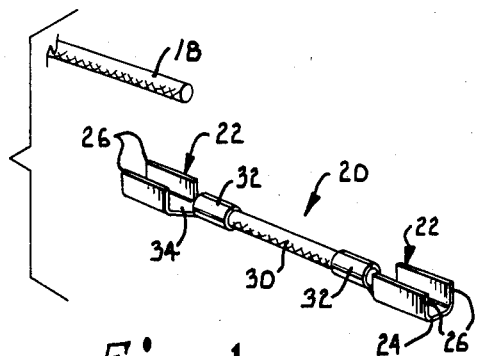
FIG. 1 is a perspective view of a net mending device constructed according to a first embodiment of the present invention, with a fragment of a broken cord end shown adjacent to the device.
Figure 2:
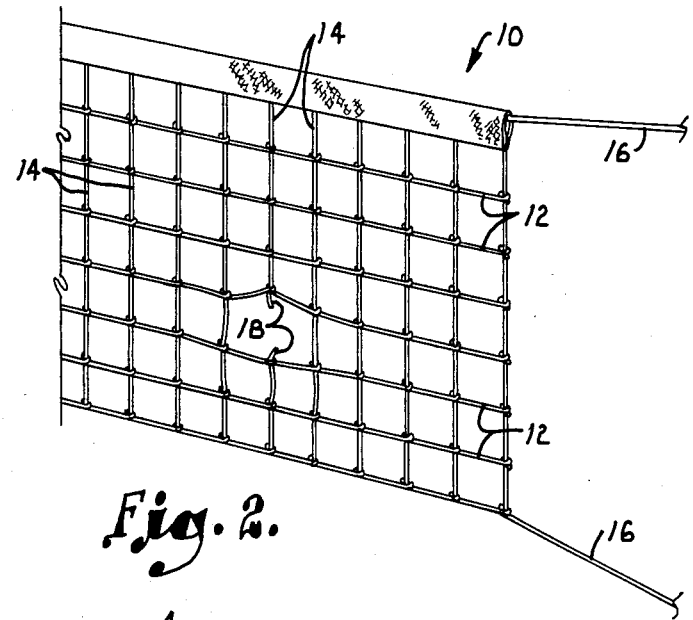
FIG. 2 is a fragmentary perspective view of a net having two broken cords, one of which has been repaired by the device shown in FIG. 1.
Figure 3:
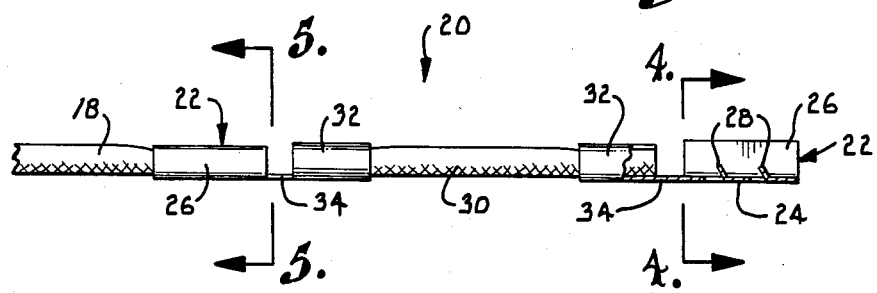
FIG. 3 is a side elevational view showing the device of FIG. 1 applied to one broken cord end.
Figure 4:
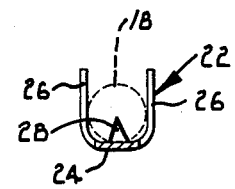
FIG. 4 is a fragmentary sectional view taken generally along line 4—4 of FIG. 3 in the direction of the arrows, with a second damaged cord end shown in broken lines.

Referring now to the drawing in more detail and initially to FIG. 2, numeral 10 generally designates a net of the type used in sporting activities such as volleyball. The net 10 is a meshwork structure formed by a series of horizontal cords 12 which are interwoven with a plurality of vertical cords 14. The horizontal cords 12 are looped around the vertical cords in order to provide square mesh openings of uniform size between the adjacent pairs of cords. Opposite ends of the net are provided with support cords 16 which are used to secure the net to support poles or the like (not shown).

The cords 12 and 14 may be constructed of nylon or any other suitable synthetic or natural material or a combination of synthetic and natural materials. When one of the cords breaks, a pair of broken cord ends remain adjacent to the break, as indicated by the broken cord ends 18 on opposite sides of the break in one of the vertical cords 14.

With additional reference to FIGS. 1 and 3-5, numeral 20 generally designates a net mending device constructed according to a first embodiment of the present invention. The device 20 includes at its opposite ends a pair of U shaped ferrules 22, each of which includes a flat base 24 and a pair of parallel deformable flaps 26. Each ferrule 22 is open at its opposite ends and its top, and the flaps 22 are spaced apart far enough to closely receive one of the cord ends 18 between them. Each base 24 occupies a plane which is substantially perpendicular to the planes which contain the flaps 26, and the cord end 18 is placed against the flat surface of base 24 when it is inserted in the ferrule. Projecting upwardly from each base 24 is a plurality of teeth 28 which bite into the cord end 18 inserted in the ferrule. Each tooth 28 is triangular and terminates in a sharp tip. The teeth 28 are preferably punched from base 24. The teeth 28 slope inwardly somewhat away from the outer end of the ferrule as they extend away from base 24.

Device 20 includes a flexible cord element 30 which is preferably constructed of the same material as the cords 12 and 14 of net 10. The cord element 30 serves as a splice between the broken cord ends 18 and is connected to extend between the two ferrules 22. Each ferrule 22 is provided with a small sleeve 32 which is connected with the main body of the ferrule by a tapered neck 34 which extends from the base 24. The sleeves 32 are crimped around the opposite ends of the cord element 30 in order to securely grip it, and the cord element serves to connect the two ferrules 22 to one another.

Figure 5:
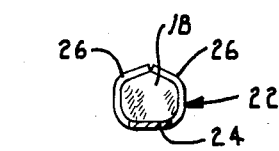
FIG. 5 is a fragmentary sectional view taken generally along line 5—5 of FIG. 3 in the direction of the arrows.

In use, the net mending device 20 is applied to the damaged cord 14 by first applying one of the ferrules 22 to one of the cord ends 18. The cord end 18 extends into the trough like channel which is formed in the ferrule 22 between the flaps 26 and above the base 24. After the cord end 18 has been received in the ferrule, the flaps 26 are deformed inwardly and downwardly such that they securely crimp the cord end 18 in the ferrule. As best shown in FIG. 5, the flaps 26 are crimped onto the cord end 18 such that the cord end is compressed with the flaps 26 and base 24 cooperating to completely enclose the cord end and securely grip it. This secures one of the ferrules 22 on one of the cord ends 18. It is noted that the teeth 24 bite into the cord end 18 and assist in securing the connection. The angle at which the teeth 28 are oriented helps in resisting any tendency for the cord 18 to pull longitudinally out of the ferrule 22.

The opposite ferrule 22 is applied and secured to the other broken cord end 18 in the same manner. Before the deformable flaps 26 of the second ferrule are crimped onto the cord end 18, the cord 14 and the cord element 30 are held taut, thus assuring that the repaired cord will be in a taut condition following crimping of flaps 26 onto the cord end.

FIG. 2 illustrates device 20 in place on a broken vertical cord 14, and it is noted that the damaged cord has been restored to essentially the same condition it had prior to the break. The device 20 does not detract significantly from the appearance of the net, and the repaired cord 14 is able to function in the same manner as it did prior to breaking.

It is contemplated that the device 20 will be provided with cord elements 30 which vary in length. This permits the repair of broken cords in which the portions which are broken away vary in length, since all that is necessary is for a device 20 having the appropriate length to be selected in order to span the broken portion of the cord. It is also noted that the broken cord ends 18 can be extended partially or completely through each of the ferrules 22, and this capability adds to the versatility of the device 20 and permits it to accommodate breaks which vary in the length between the cord ends 18.

Figure 6:
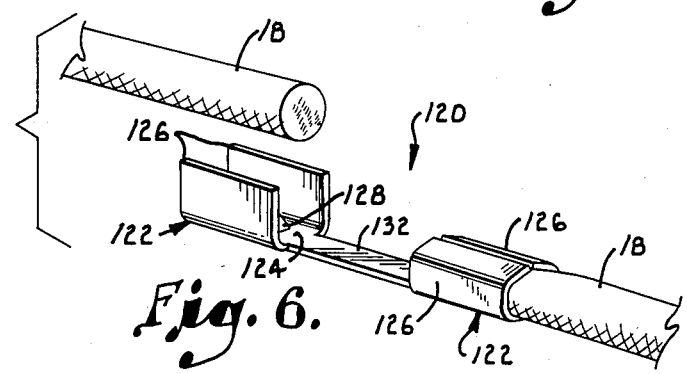
FIG. 6 is a perspective view of a net mending device constructed according to a second embodiment of the invention, with the device applied to one broken cord end and another broken cord end shown adjacent to the opposite end of the device.

FIG. 6 illustrates a second embodiment of the net mending device which is generally designated by numeral 120 and which includes a pair of ferrules 122 which are identical to the ferrules 22 described previously. The device 120 does not include cord element 30 or sleeves 32. Instead, the two ferrules 122 are rigidly connected with one another by a metal strip 132 which extends between and is integral with the bases 124 of the two ferrules. The connecting strip 132 is flat and occupies the same plane as the bases 124.

In use, the device 120 is applied to the two broken cord ends 18 in the same manner described in connection with device 20. It is contemplated that the device 120 will be provided in different lengths, with the connecting strip 132 varying in length to vary the overall length of the device. The use of the rigid metal connecting strip 132 provides the device 120 with the strength to withstand considerable abuse. Accordingly, it is contemplated that the device 120 will be used to repair nets which are expected to encounter considerable abuse.

Figure 7:
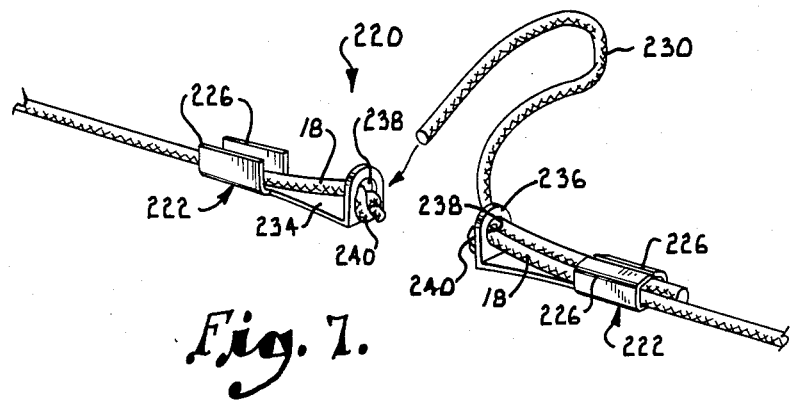
FIG. 7 is a perspective view of a device constructed according to a third embodiment of the invention, with the device being applied to repair a broken net cord.

A third embodiment of the net mending device is illustrated in FIG. 7 and is generally designated by numeral 220. Device 220 includes a pair of ferrules 222 which are identical to the ferrules 22 described previously and which are initially disconnected from one another. Extending from one end of each base 224 is a flat tongue 234 which is integral with and coplanar with the base 224. Each tongue 234 gradually broadens as it extends away from base 224, and the end of each tongue remote from ferrule 222 is provided with an end plate 236. Each plate 236 is integral with tongue 234 and occupies a plane that is perpendicular to the plane of tongue 234 and base 224. A round opening 238 is formed in each end plate 236. Each opening 238 is large enough to closely receive one of the broken cord ends 18 and a flexible cord element 230 having the same diameter as the cord end 18. Cord element 230 is flexible and is preferably constructed of the same material as the net cords 12 and 14.

In use, the device 220 is applied to the broken cord by first extending one of the broken cord ends 18 through one of the ferrules to 22 and also through the opening 238. Then, the broken cord end is tied in a knot as indicated at 240. The knot 240 is too large to pass back through the opening 238.

One end of the cord element 230 is then threaded through opening 238 and also through the ferrule 222 adjacent to the portion of the cord end 18 which extends through the ferrule. The deformable flaps 222 are then crimped onto the cord end 18 and the cord element 230 in the manner indicated previously in connection with the first embodiment of the invention.

The other cord end 18 is then extended through the other ferrule 222 and is threaded through opening 238 and knotted such that the knot 240 is too large to pass back through opening 238. The remaining free end of the cord element 230 is then threaded through opening 238 as indicated by the directional arrow in FIG. 5, and the end of the cord element is also extended through the second ferrule 222. The two halves of the device 220 are pulled toward one another to maintain the broken cord in a taut condition, and flaps 226 of the second ferrule are then crimped onto cord end 18 and cord element 230 with the cord element also maintained in a taut condition. This completes the mending of the broken cord.

It is noted that the broken cord ends 18 are secured in two places, namely at the knots 240 and at the areas of the cord ends onto which the deformable flaps 226 are crimped. In addition, the teeth 228 bite into the cord ends 18 and the connecting cord element 230. In this manner, device 220 is secured to the damaged cord in different ways and at different locations in order to provide considerable security for resisting forces tending to pull the mending device off of the cord.

It is also to be noted that the connecting cord element 230 can have virtually any length in order to permit the repair of broken areas which vary considerably in their length. After the device 220 has been applied to the damaged cord, any parts of the connecting cord 230 which extend outwardly beyond the ferrules 222 can be cut off if desired.

Figure 8:
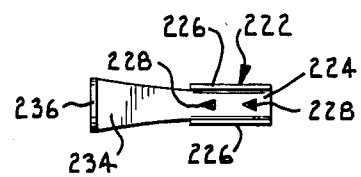
FIG. 8 is a plan view of one part of the net mending device shown in FIG. 7.

It is thus evident that the various embodiments of the present invention provide net mending devices which can be used to reliably repair a damaged cord of a net of the type used in various sports such as basketball, volleyball, tennis, soccer and fishing. Preferably, the ferrules and connected parts are constructed of metal which is able to firmly grip the damaged cord when crimped onto it. The gripping action provided by the deformable flap resists slipping of the cord ends, in cooperation with the teeth 28 (and the knot 240 and end plate 238 of the embodiment of FIGS. 7-8).

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a net mending arrangement for repairing a meshwork net having a broken cord presenting a pair of spaced apart cord ends on opposite sides of the break, the improvement comprising:

a pair of ferrules each having a base and a pair of deformable flaps extending from the base on opposite sides thereof for crimping onto a cord ends, each ferrule being open at opposite ends thereof to receive a cord end through the ferrule with the cord end disposed on the base and between the flaps;

a tongue on each ferrule extending from the base thereof;

an end plate on each tongue at a location spaced from the flaps of the ferrule, each end plate having an opening through which the cord end received by the ferrule is extended and knotted to prevent the cord end from passing back through the opening; and a flexible cord element extended through the openings and ferrules, said flaps being deformably crimped onto the cord ends and cord element with the cord and cord element held taut to mend the break in the cord.

2. The improvement of claim 1, including a plurality of teeth on the base of each ferrule for biting into a cord end applied thereto.

3. The improvement of claim 1, wherein:

said base and tongue of each ferrule present substantially coplanar surfaces; and said end plate of each ferrule is oriented substantially perpendicular to said coplanar surfaces.

* * * * *